(12) United States Patent  
Michelsen

(10) Patent No.: US 9,015,668 B1
(45) Date of Patent: Apr. 21, 2015

(54) INSTRUMENTATION AGENT FOR MANIPULATING COMPONENT RESPONSES IN A TEST

(75) Inventor: John J. Michelsen, Irving, TX (US)

(73) Assignee: Interactive TKO, Inc., Plano, TX (US)

( * ) Notice: Subject to any disclaimer, the term of this patent is extended or adjusted under 35 U.S.C. 154(b) by 572 days.

(21) Appl. No.: 13/207,086

(22) Filed: Aug. 10, 2011

(51) Int. Cl.
*G06F 9/44* (2006.01)

(52) U.S. Cl.
CPC ........................................ *G06F 8/70* (2013.01)

(58) Field of Classification Search
None
See application file for complete search history.

(56) References Cited

U.S. PATENT DOCUMENTS

| | | | | |
|---|---|---|---|---|
| 7,721,154 | B1 * | 5/2010 | Jaamour et al. | 714/38.14 |
| 7,730,452 | B1 * | 6/2010 | Li et al. | 717/124 |
| 7,743,150 | B1 * | 6/2010 | Carter et al. | 709/227 |
| 7,890,808 | B2 * | 2/2011 | Branca et al. | 717/124 |
| 8,166,458 | B2 * | 4/2012 | Li et al. | 717/124 |
| 8,176,476 | B2 * | 5/2012 | Li et al. | 717/130 |
| 8,307,345 | B2 * | 11/2012 | Sunkara et al. | 717/130 |
| 8,533,674 | B2 * | 9/2013 | Abrams et al. | 717/120 |
| 2005/0204339 | A1 * | 9/2005 | Davis et al. | 717/120 |
| 2006/0037000 | A1 * | 2/2006 | Speeter et al. | 717/120 |
| 2006/0070034 | A1 * | 3/2006 | Balfe et al. | 717/124 |
| 2008/0276227 | A1 * | 11/2008 | Greifeneder | 717/130 |

OTHER PUBLICATIONS

Grundy et al. Deployed software component testing using dynamic validation agents. Journal of Systems and Software vol. 74, Issue 1, Jan. 1, 2005, pp. 5-14. Retrieved on [Dec. 13, 2014] Retrieved from the Internet: URL<http://www.sciencedirect.com/science/article/pii/S0164121203003157#>.*
DaSilva et al. On the use of Dynamic Binary Instrumentation to perform Faults Injection in Transaction Level Models. Fourth International Conference on Dependability of Computer Systems, 2009, pp. 237-244, Retrieved on [Dec. 13, 2014] Retrieved from the Internet: URL<http://ieeexplore.ieee.org/stamp/stamp.jsp?tp=&arnumber=5261012>.*
Interactive TKO, Inc., "LISA 2.0 User's Guide", Feb. 27, 2003.
Interactive TKO, Inc., "LISA 2.0 Developer's Guide", Mar. 13, 2003.

* cited by examiner

*Primary Examiner* — Thuy Dao
*Assistant Examiner* — Cheneca Smith
(74) *Attorney, Agent, or Firm* — Patent Capital Group

(57) ABSTRACT

A first software agent is used to intercept first data sent to a first software component from a second software component during a test of a particular software system, each of the first and second software components included in a plurality of software components that are included in the particular software system. The first agent is used to determine that a particular value of the intercepted first data is different from one or more preferred values for the first data. Substitute data having a preferred value is passed to the first software component in lieu of the intercepted data.

20 Claims, 9 Drawing Sheets

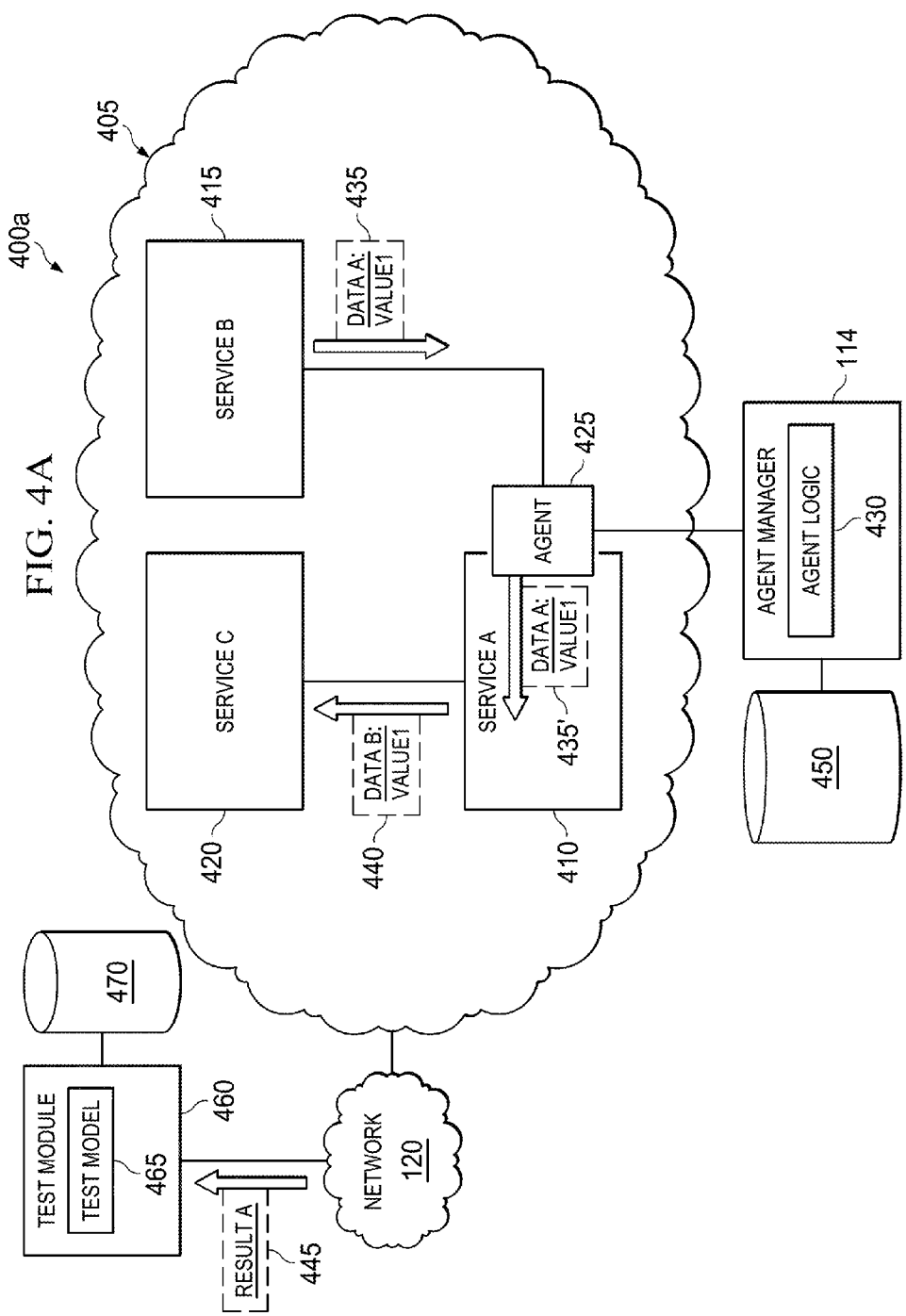

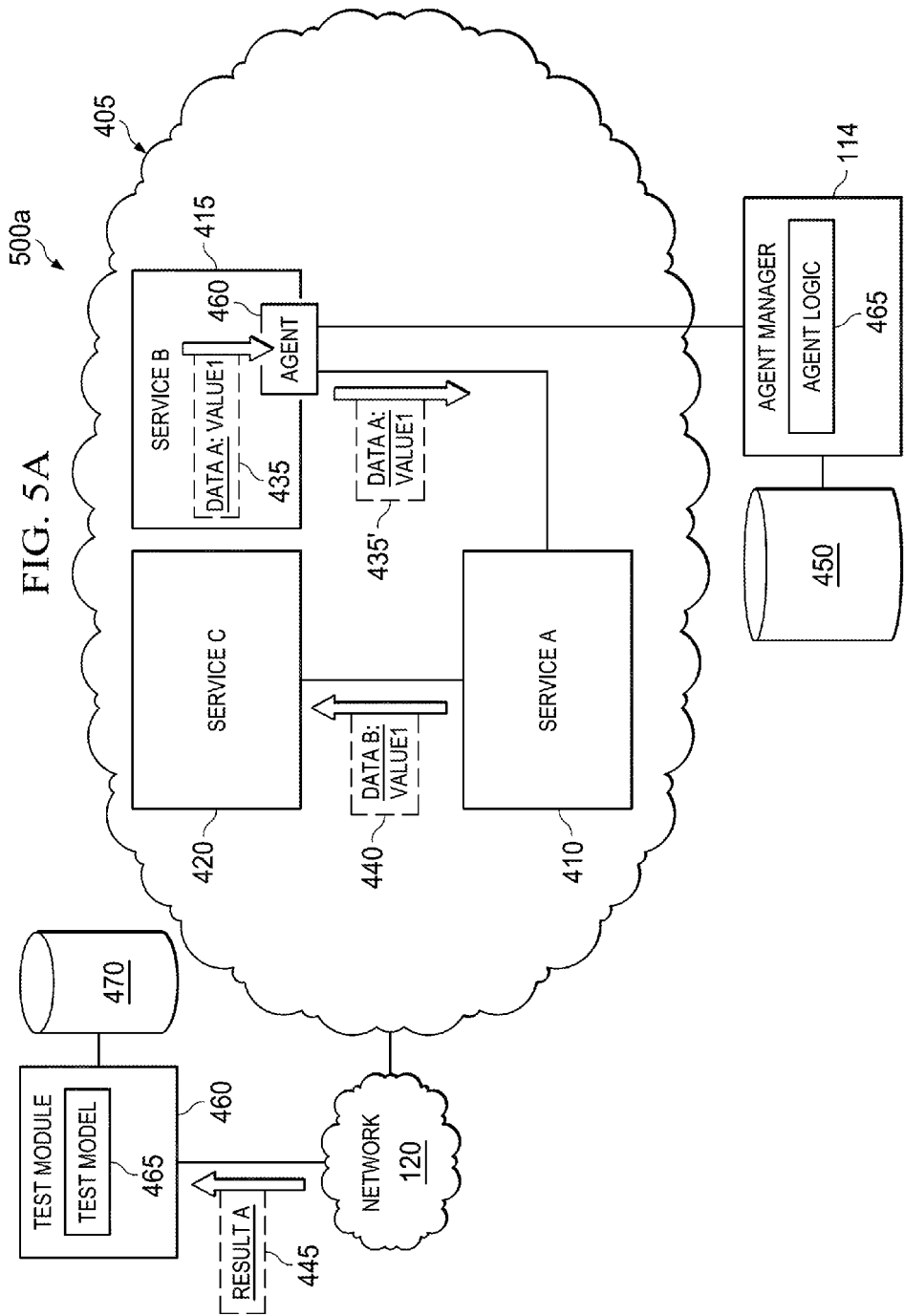

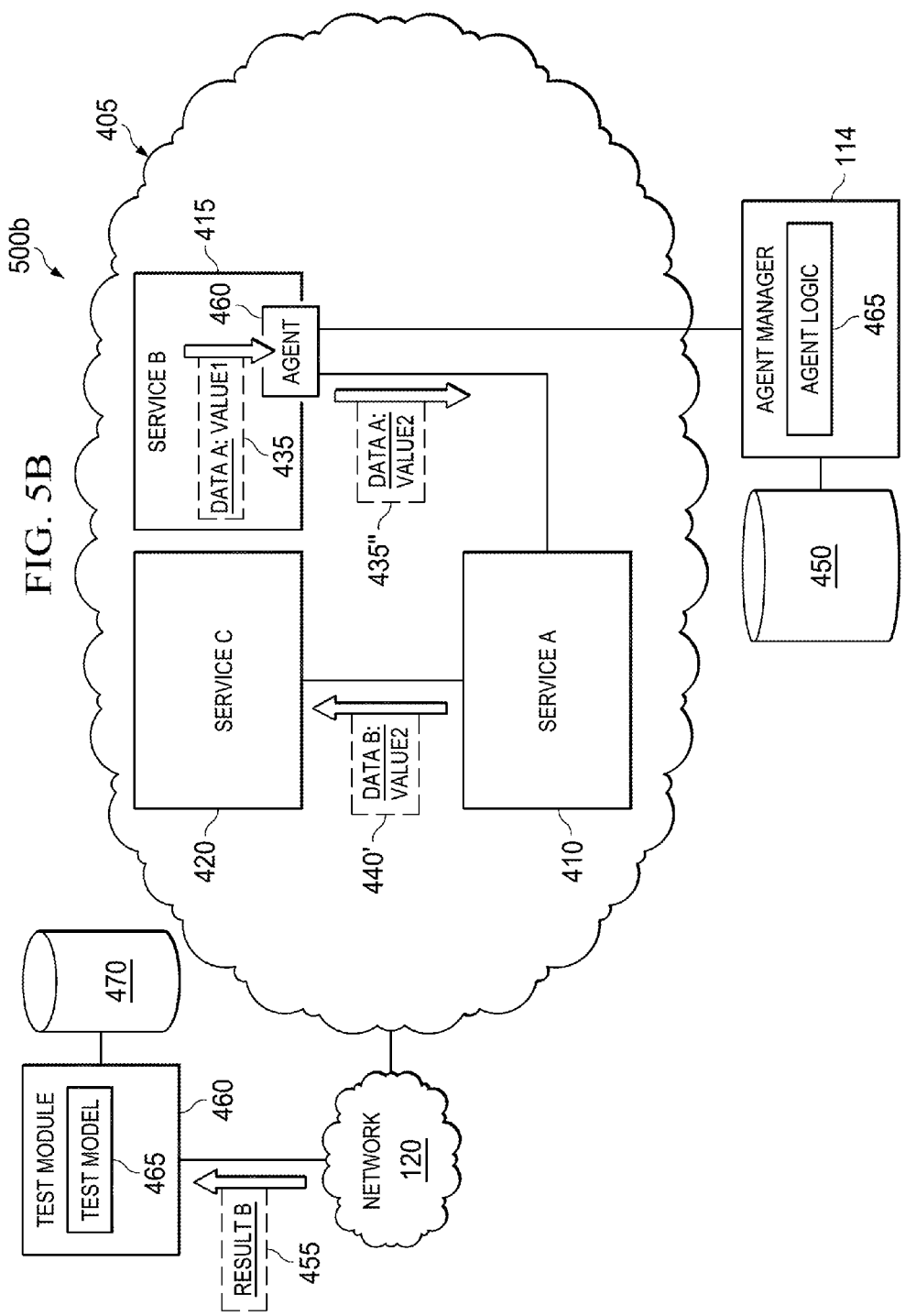

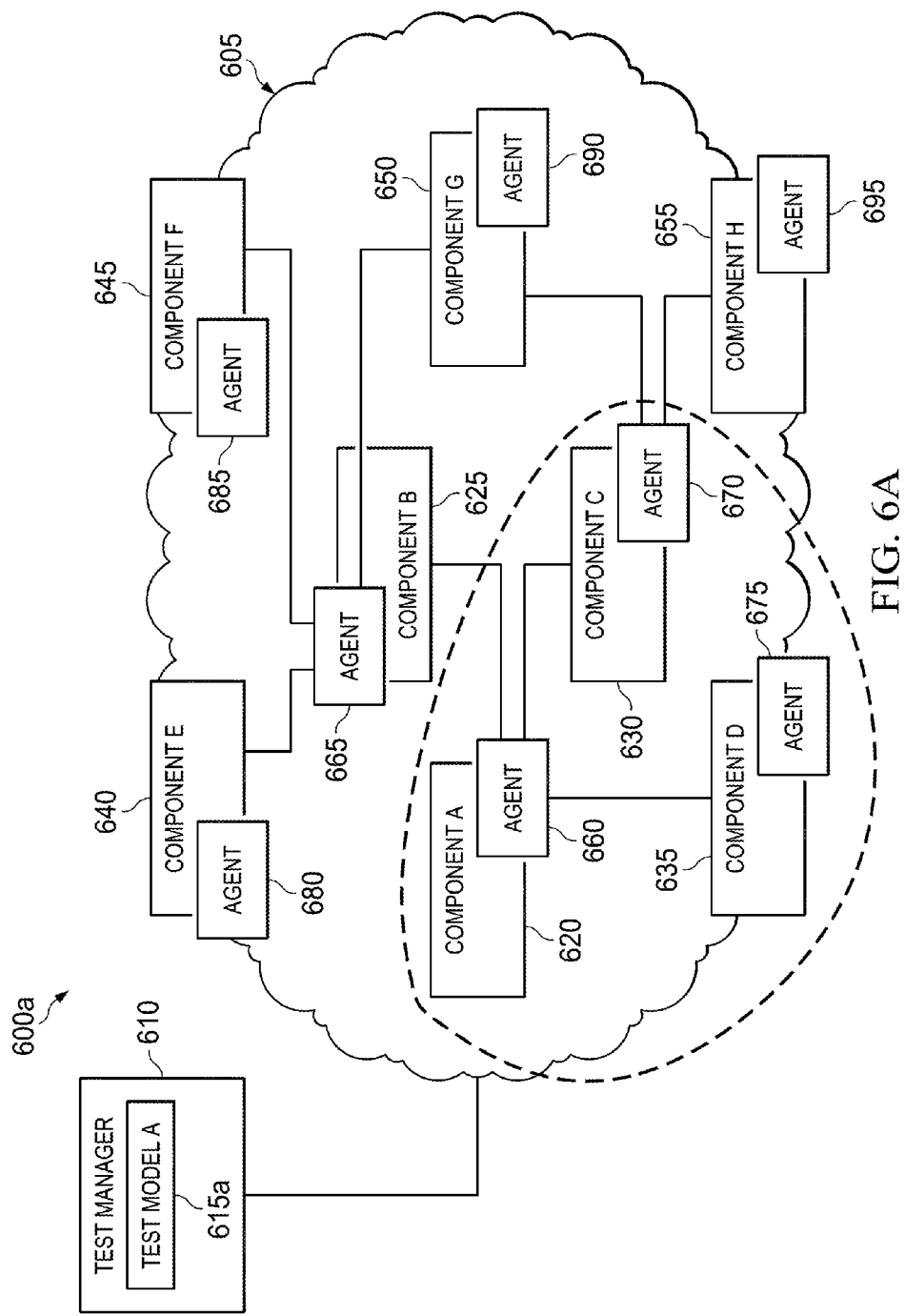

INSTRUMENTATION AGENT FOR MANIPULATING COMPONENT RESPONSES IN A TEST

TECHNICAL FIELD

This disclosure relates in general to the field of computer systems test and, more particularly using agents within the context of such a test.

BACKGROUND

Deployments of composite applications and systems are increasing. Composite applications and systems can include multiple different software components working in combination to deliver particular results or services. In some composite systems and applications, software components from a variety of different sources and developers can be combined and cooperatively function. While efficiencies and advantages have been realized in the development of software by employing composite components, testing of such systems can be difficult.

Further, agents have been embedded in software components. Typical agents serve a non-invasive role, monitoring and collecting information from software components without affecting the operation or functions of the software component themselves. For instance, software agents have been described in U.S. patent application Ser. No. 11/328,510, titled "Instrumentation System and Method for Testing Software," filed Jan. 9, 2006, to John J. Michelsen and U.S. patent application Ser. No. 13/155,363, titled "Modeling and Testing of Interactions Between Components of a Software System," filed Jun. 7, 2011, to John J. Michelsen, et al.

SUMMARY

In general, one aspect of the subject matter described in this specification can be embodied in methods that include the actions of intercepting, using a first agent, first data sent to a first software component from a second software component during a test of a particular software system, each of the first and second software components included in a plurality of software components that are included in the particular software system. The first agent can determine that a particular value of the intercepted first data is different from one or more preferred values for the first data. Substitute data having a preferred value can be passed to the first software component in lieu of the intercepted data.

In another general aspect of the subject matter described in this specification can be embodied in systems that include a memory element storing data, a processor operable to execute instructions associated with the stored data, at least one first software component interacting with at least one other software component in a software system, and at least one agent. The agent can be configured to intercept particular data sent to the first software component from at least one other software component during a test of a software system including at least the first software component and the other software component, determine that a particular value of the intercepted particular data is different from one or more preferred values for the particular data, within the context of the test, and pass substitute data having a preferred value to the first software component in lieu of the intercepted particular data.

These and other embodiments can each optionally include one or more of the following features. The one or more preferred values for the first data can permit successful completion of the test. The value of the intercepted first data, when used in the test, can cause an undesired test result. At least one test result collected during the test can be dependent on the value of first data sent to the first software component from the second software component. The first software component can use the substitute first data to generate additional data and the at least one test result collected during the test is dependent on the additional data. The additional data can be collected as the at least one test result. The particular test can be based on a test flow including (i) a first transaction including the sending of the first data to the first software component from the second software component, and (ii) at least one second transaction downstream from the first transaction in the test flow, the second transaction at least partially dependent on the value of first data sent to the first software component from the second software component in the first transaction, where the test result is collected from monitoring of the second transaction. One or more aspects of the test can be identified and determining whether the particular value of the intercepted first data is different from one or more preferred values and passing substitute data having preferred values to the first software component in lieu of the intercepted data can be based at least in part on the identified one or more aspects of the test. The first data can be intercepted by the first agent in a first instance of the test, and the first agent can be adapted to pass, to the first software component, intercepted alternate first data intercepted during at least one other instance of the test, when the alternate first data has preferred values for the first data. The first data can be intercepted by the first agent in a first test having a first test model. The second data sent to the first software component from the second software component during a second test of the particular software system can be intercepted using the first agent. The second data can have a second value equal to the particular value of the first intercepted data and the second test can have a second test model different from the first test model. It can be determined, at the first agent, that the second value of the intercepted first data conforms to a preferred value for the second data in the context of the second test. Second data having the preferred second value can be allowed to pass to the first software component during the second test.

Further, embodiments can each optionally include one or more of the following additional features. An identity of the test can be determined and determining whether values of data, intercepted by the first agent, are preferred can be based at least in part on the identification of the test. The first agent can interface with the first software component and intercept the first data before it is received by the first software component. The first agent can interface with the second software component and intercept the first data before it is sent to the first software component from the second software component. The particular software system under test can be a composite software system and the first software component can be an element of a first software system and the second software component can be an element of a distinct, second software system. The substitute first data can be generated at the first agent in response to determining that the particular value is different from the one or more preferred values. The substitute first data can be generated based on monitored interactions between the first and second software components. At least the first software component and one other software component can be monitored by a test system during the test. An agent manager can be provided that is configured to provide logic to the first agent and at least one other agent intercepting data sent to a third software component included in the software system from a fourth software component also included in the software, and receive reporting data from one or more of the first agent and the at least one other agent.

DESCRIPTION OF DRAWINGS

FIGS. 4A-4B illustrate representations of examples of using instrumentation agents to modify incoming software component responses.

FIGS. 5A-5B illustrate representations of examples of using instrumentation agents to modify outgoing software component responses.

FIGS. 6A-6B illustrate representations of examples of using instrumentation agents to modify software component interactions based on test characteristics.

Like reference symbols in the various drawings indicate like elements.

DETAILED DESCRIPTION

Figure 1:
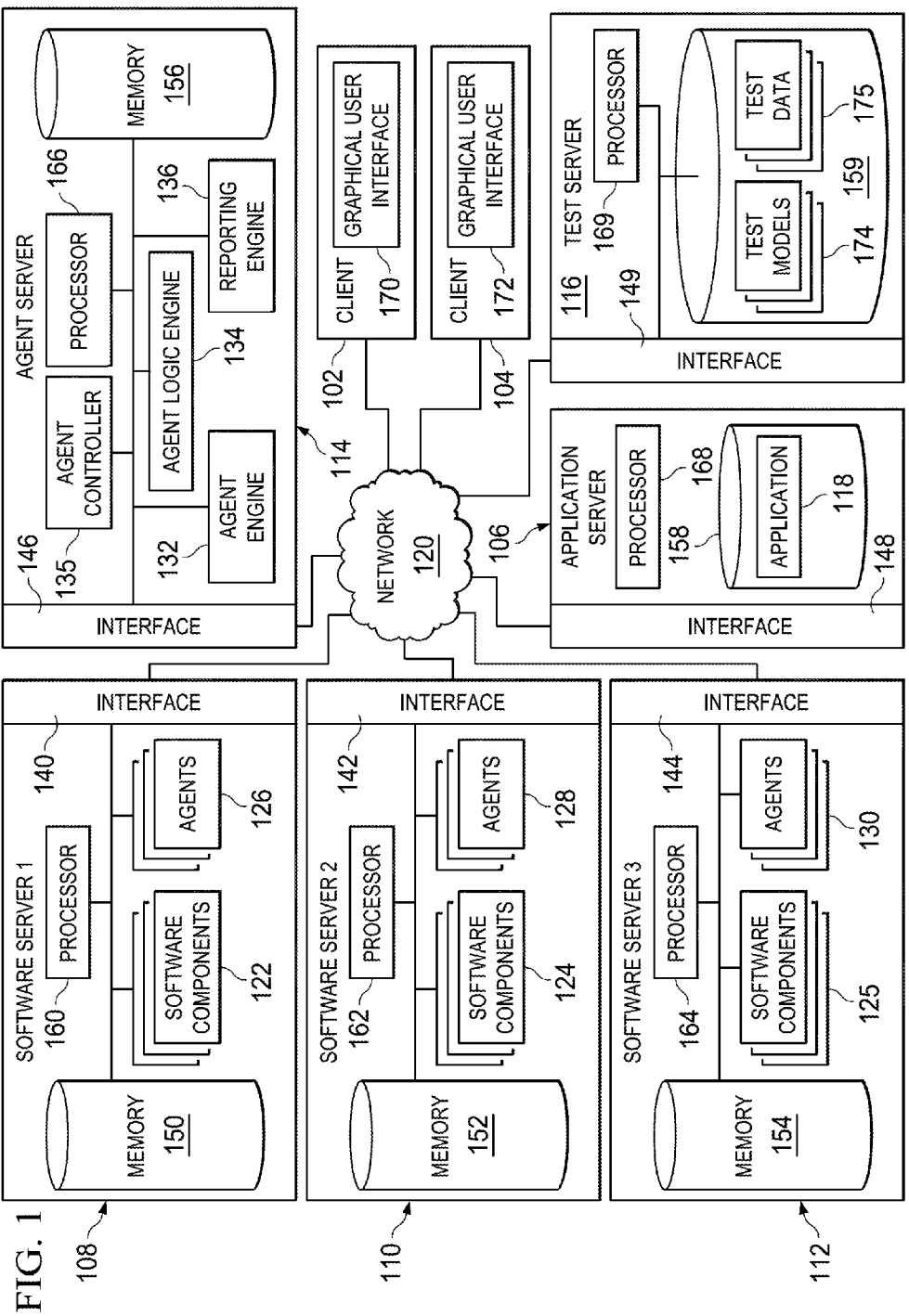
FIG. 1 illustrates an example system including instrumentation agents.

Testing of a software system can include the development or provision of a suitable test environment or lab. In some instances, testers develop a specialized deployment of a system specifically adapted for a test of the system. Further, specialized test data sets, component stubs, test data structures and databases can also be developed in lieu of or supplementing the actual, for-production system and components, in order to realize the specific objectives of a particular test. Such efforts can be costly and time-consuming and delay the launch of a test. Further, some test resources developed for particular tests may not be useable in others, leading to the re-development of several sets of specialized test resources tailored to the specific objectives of various tests. Further, performing a test on a modeled or specialized test system, rather than on the for-production system components themselves can lead to an imperfect picture of the actual system under test. Accordingly, in many instances, it can be advantageous to perform testing on the actual for-production system itself or at least a portion of the actual system, including for-production systems in pre-production as well as live-deployed, post-production systems. For-production software components of the system can be tested as well as the actual data structures and databases intended for use in production, to ease development of a test lab as well as improve the accuracy of test results generated from a test of the system.

While testing a for-production version of the system can be advantageous, testing the real world system, rather than an idealized or stubbed version of the system can cause imperfections, nuances, errors, and other issues inherent in the system to interfere with testing of the system. For instance, bugs and imperfections in particular software components can cause unforeseen errors and outputs, including results that affect a test flow or that are of little interest within the context of a particular test. Further, in composite systems that make use of a variety of different components, including components from third-party vendors and sources, unpredictable interactions and transactions may surface during a test of the system that interfere with the objectives of the test.

Further, using real data in connection with a test of a system, such as data stored in the system's databases, can result in "burned" data issues, making it difficult or impossible to reuse particular data within a test or within cycles of the same test. To illustrate, consider an example test of a system concerned with monitoring how the system responds to particular data records having a particular set of values. The test can cause the system to access and operate on this data, in some cases, thereby changing the values of the data. If values that were important to an assumption or objective of the test are changed, the particular data record cannot be reused within the test and the data record is considered "burned." Moreover, it may be difficult to find other data records in the system to replace the burned data, such as other records that also happen to include specific values underpinning assumptions of a particular test, among other examples.

To remedy the issues identified above, among others, instrumentation agents can be deployed on software components of a system under test to temporarily and conditionally change or supplement the operation of particular software components and values of data exchanged within the system during a test so as to assist in optimizing a system under test for use within the particular test. In some instances, instrumentation agents can conditionally operate, depending on the specific identify and objectives of a test, to intervene in transactions of software components initiated during a test to assist in realizing the particular objectives of the test. For instance, an agent embedded in a software component can intercept data destined for the software component and potentially modify values of the data to ensure that the data's values are consistent with the assumptions and objectives of the test, among other examples and advantages.

FIG. 1 illustrates a computing system 100 including, or communicably coupled with, one or more clients 102, 104, one or more application servers (e.g., 106), and other computing devices, such as servers 108, 110, 112 serving one or more software components (e.g., 122, 124, 125), such as applets, databases, applications, services, managers, plug-ins, enterprise software modules, and other components. Such components can be used, for example, in connection with a composite software application or system. A test server 116 can also be provided for use in launching tests of various software systems and sub-systems, including systems that include or otherwise make use of software components (e.g., 122, 124, 125) served by servers 108, 110, 112 and other sources. Additionally, one or more agent manager servers 114 can be provided to provide support and manage one or more instrumentation agents (or "agents") (e.g., 126, 128, 130) interfacing with software components served by the one or more software servers 108, 110, 112. Such agents can be used in connection with software system tests utilizing test server 116. Computing devices 102-114 can be communicably coupled via one or more networks 120.

In general, each of "servers" 106, 108, 110, 112, 114, 116 can include electronic computing devices operable to receive, transmit, process, store, or manage data and information associated with the software system 100. As used in this document, the term "computer" or "computing device" is intended to encompass any suitable processing device. For example, the system 100 may be implemented using computers other than servers, including server pools, as well as virtual devices and computers provisioned in a cloud computing environment. Further, any, all, or some of the servers 106, 108, 110, 112, 114, 116 may be adapted to execute any operating system, including Linux, UNIX, Windows Server, etc., as well as virtual machines adapted to virtualize execution of a particular operating system, including customized and proprietary operating systems.

Servers 106, 108, 110, 112, 114, 116 and other computing devices (e.g., 102, 104) can each include one or more interfaces (e.g., 140, 142, 144, 146, 148, 149), computer-readable memory (e.g., 150, 152, 154, 156, 158, 159), and one or more processors (e.g., 160, 162, 164, 166, 168, 169). Each server can further include code that creates an execution environment for the computer program in question, such as an operating system, or one or more virtual machines. Additional software modules, applications, simulators, and functionality can also be executed on servers 106, 108, 110, 112, 114, 116.

Test server 116 can include one or more processors 169 and memory 159 for use in performing, launching, or otherwise managing tests on software systems, including composite software systems making use of a plurality of different software components 122, 124, 126 including combinations of software components from different sources, servers, and vendors. Test models 174 can be stored and generated using test server 116 to develop and control tests of various functionality, transactions, and sub-systems within a software system. Test models 174 can define the scope of the test (e.g., the number of test iterations, the portions and components of the system that are to be tested, traffic load to be applied, time of the test, etc.), the particular system transactions and functions to be tested, the flow of the test, as well as provide the logic for executing the test and controlling the operation flow of the test using relevant components of the system. A potentially limitless variety of test models 174 can be developed for use in testing a similarly limitless variety of transactions, operations, and system types. Additionally, test data 175 generated during the test, including statistical data and other results captured and calculated during or after execution of the test, can also be stored, aggregated, processed, and otherwise managed by test server 116. Additionally, in some instances, test server 116 can launch and provision tests and testing environments within a virtual testing space, using resources provisioned on virtual machines within a cloud computing system or server pool. Either or both of the resources of the system under test or the computing resources of the test server can be provisioned virtually within a virtual test environment in connection with the test of the system.

Test server 116 can be used to test composite software systems including a plurality of different software components interacting or otherwise cooperatively operating within a system under test. To assist in the monitoring of the software components under test, agents (e.g., 126, 128, 130) can be provided that are embedded in, interface with, or otherwise operate in association with at least some of the software components (e.g., 122, 124, 126) under test. Agents 126, 128, 130 can also be used in connection with test models 174 and test server 116, to control the flow of a test from software component to software components. Further, in some instances, agents 126, 128, 130 can be further used to manipulate data exchanged or sent between software components during a test, for instance, to assist in driving a desired test flow, provide desired inputs in connection with a test, control dependencies within a test, mitigate against test errors, among other examples. Through the use of agents, a production system (or a virtualization of the production system) can itself be tested, thereby avoiding the use of test databases, test and stub components, and other resources developed and utilized specifically for one or more tests and outside of the for-production implementation of the system. The agents can be selectively activated in response to the launching of one or more tests to perform functions relating to one or more particular tests or testing environments.

In some instances, software systems can be developed using combinations of various software resources, services, applications, data structures, and other components to deliver a particular result or service. Indeed, some modern software systems deliver such services and applications using composite software system architectures made-up of a plurality of different software components (e.g., 122, 124, 125), including combinations of software components served by multiple different server devices (e.g., 108, 110, 112) and vendors. Various software components can interface with and execute in cooperation with other software components. Further, some software components can be "out-of-the-box," "plug-and-play," "modular," or otherwise reusable software components capable of being used and re-used in connection with multiple other software components and within multiple different software systems and applications. Agents (e.g., 126, 128, 130) can be provided for use in connection with a plurality of different software components, including components from different developers and sources. Accordingly, agents 126, 128, 130 can be embedded in, integrated with, or otherwise coupled to corresponding software components or sub-components within a system to supplement, retrofit, or otherwise modify components with the functionality and logic of agents 126, 128, 130 to, for example, assist a test system (e.g., 116) in a driving, managing, and collecting data in connection with testing of the system and components. In some instances, agents 126, 128, 130 added to software components 122, 124, 126 can provide functionality including the monitoring of internal processes and data of the software components, monitoring of messaging between the software component and other components and systems, as well as the selective manipulation of data exchanged or sent between software components during testing. Manipulation of data by embedded agents can include intercepting of messaging between two different software components during a test and modification of the intercepted data so as to influence the performance of a software component that is to receive and process the intercepted data in connection with one or more objectives, models, or flows of a test.

In addition to the provision of agents interfacing with software components of a system, an agent manager server 114 can be provided to manage the provision, use, updating, and monitoring of agents (e.g., 126, 128, 130) deployed in a system 100. While agents 126, 128, 130 can each be specially adapted to interface with or be embedded within its corresponding software component, each agent can nonetheless be adapted to function in connection with and communicate with agent management server 114. In some instances, agent manager server 114 can additionally interface with and operated in connection with a test server 116 to manage the operation of agents 126, 128, 130 within a particular test executed using resources of test server 116. In some instance, one or more agent managers 114 can be provided, such as a centralized agent manager system managing a plurality of agents deployed in a plurality of varied and distinct software systems, agent managers responsible for agents deployed in a single system, as well as agent managers managing agents deployed within systems of a particular enterprise, business unit, or other entity or organization. Agent manager 114 can include one or more processor devices (e.g., 166) and memory elements (e.g., 156) and include an agent engine 132, agent logic engine 134, agent controller 135, and agent reporting engine 136.

An agent engine 132 can be provided, adapted to serve, integrate, interface, embed, synchronize, control, or otherwise launch agents on corresponding software components. Further, agent engine 132 can generate an agent, or agent logic, in connection with agent logic engine 134, customized for use with a particular software component. Agent logic engine 134 can also be used to periodically, and automatically, update the logic of a particular agent executing in connection with a particular software component. In some instances, agent engine 132 can generate a particular agent instrumented to monitor and handle messaging between a particular software component and one other software component. The agent engine 132 (and/or agent logic engine 134) can automatically, or dynamically, generate an agent or agent logic based on one or more models generated through monitoring of interactions and messaging between the two software components. In some instances, generation of an agent or agent logic can be based on a virtual service model itself generated by capturing and recording live, simulated, or virtualized traffic between the two or more software components. In one example, such a virtual service model can be based on concepts described, for example, in U.S. patent application Ser. No. 12/242,783 to John J. Michelsen (filed Sep. 30, 2008), incorporated herein by reference in its entirety as if completely and fully set forth herein.

Agents can conditionally monitor and modify messages transmitted between one or more software components during a test of a system including the software components. Further, operation of a particular agent can be conditioned on the particular test being performed. A single system, transaction, and/or set of software components can be involved in a plurality of different tests that can be developed and run on the system. Depending on the nature, flow, and objectives of the test (e.g., as defined in the test's model 174), an agent embedded within a corresponding software component can make use of particular logic to assist in realizing the specific purposes of the particular test. Indeed, a single agent can provide or embody logic for use within a plurality of different tests and contexts.

Further, in some instances, an agent can be controlled (e.g., using test server 116, agent controller 135, etc.) to execute particular portions of its logic based on the identity of the particular test being executed. In some instances, agents can include internal logic for use in identifying a particular test and/or controlling which logic is used in connection with a particular identified test. Indeed, in some implementations, an agent can enable certain functionality in connection with some tests and behave differently (or even be disabled) in connection with others. For example, in some tests, the values of outputs of a particular software component can be controlled using an agent modifying the outputs, while in other test, the agent does not modify or attempt to modify the outputs of the software components. Additionally, agents can be used within non-testing contexts. Accordingly, agents can make use of certain logic and functionality based on the condition and context of the agent's (or associated software component's) operation. Further, an agent controller 135 can be used to drive or dictate operation of one or more agents deployed in a system, as well as provide logic to the agents themselves for use in controlling operation of the agents. Further, agent controller 135 can be used to provide functionality for agents to synchronize with the operations of the software components and transactions they monitor.

Agent manager 114 can additionally include reporting engine 136 for use in tracking and reporting the operation and involvement of agents in transactions of the software system (e.g., 100) monitored during a test. For instance, agents can intercept and manipulate messages and other data exchanged between software components during a test. Data describing the agents' involvement in the monitored transactions can be collected indicating when, and under what conditions an agent has intervened in a particular transaction, including how the agent intervened (e.g., modifying messages or data sent by a software component). Such data can be collected to generate reports and other data for use in analyzing the performance of one or more of the software components involved in particular transactions or types of transactions, as well as the performance of the agent itself. Moreover, reporting engine 136 can coordinate with test server 116 to supplement and/or provide test result data 175 with data collected by agents during the test. Reporting engine 136 can further generate and calculate statistical accounting data and reports based on the collected data to assist in illustrating how often an agent intervenes within tests and under what conditions. Reporting data collected by reporting engine 136 can further be used to fine tune the logic of the agents, as well as models upon which the agent logic is based. For instance, statistical data collected by the reporting engine 136 can indicate that a particular agent intervenes too seldom, too often, or under unacceptable conditions, among other examples. Such data can be used by administrators, or by the agent manager 114 itself (e.g., using agent engine 132 and/or agent logic engine 134) to modify the logic of one or more agents to align them more with the goals or models of the agent. Additionally, data describing the performance of agents can also be consulted and used to generate or optimize test models that rely, at least in part, on the operation of the agents in connection with the execution of one or more tests.

Agents (e.g., 126, 128, 130) can be software-based agents configured to interface with a wide variety of different software components. Agents 126, 128, 130 can synchronize with transactions of a monitored software component to identify and detect data sent and/or received from a particular software component. Further, in some instances, agents 126, 128, 130 can further intercept data sent or received by a corresponding software component and analyze, apply logic to, and act on intercepted data, for instance, to modify the intercepted data to change the substance of the data in advance of processing of the data by a software component. Agents can be multi-functional and, in some instance, also provide visibility into the operations of each instrumented software component (such as in connection with a test or analysis of a software component). Further, agents 126, 128, 130 can be configured to generate information about the detected or intercepted requests and/or responses and to report that information to other software entities, including agent manager 114. Further, actions taken by an agent on intercepted data can also result in information being generated, for instance, documenting the action taken. Additionally, agents 126, 128, 130 can also be configured to detect and report on activity that occurs internally within a corresponding component, such as within a component in which an instrumentation agent is embedded.

In some examples, instrumentation agents can be implemented by inserting a few lines of code into the corresponding software component (or the application server associated with that software component) being instrumented. Such code can be inserted, for example, into a servlet filter, SOAP filter, a web service handler, an EJB3 method call, a call to a Java Database Connectivity (JDBC) handler, among other examples. For instance, an instrumentation agent configured to monitor an EJB can be configured as an EJB3 entity listener (e.g., to monitor entity beans) or interceptor (e.g., to monitor session beans). In one embodiment, instrumentation agents can include additional functionality similar to that described, for example, in U.S. patent application Ser. No. 11/328,510, titled "Instrumentation System and Method for Testing Software," filed Jan. 9, 2006, and listing John J. Michelsen as an inventor, which is hereby incorporated by reference in its entirety as if completely and fully set forth herein.

Some components (or their corresponding application servers) may not provide users with the ability to modify their code, and thus some instrumentation agents can be implemented externally to the component being monitored in a manner that will cause all requests and responses being sent to and/or from that component to be handled and, in some cases, intercepted by the agents. For example, for an existing database, an agent can be implemented as a driver. Calling components can be configured (e.g., by manipulating a driver manager) to call the instrumentation driver instead of the database's driver. The instrumentation driver can in turn call the database's driver and cause the database's driver to return responses to the instrumentation driver. For example, in one embodiment, the identity of the 'real' driver for the database can be embedded in the uniform resource locator (URL) that is passed to the instrumentation driver. In this way, the instrumentation driver can intercept all calls to the database, detect characteristics of those calls, pass the calls to the appropriate database, detect characteristics of the corresponding responses, and then return the characteristics of those calls and responses to an agent manager (e.g., 114).

In some embodiments, agents can be configured to perform interception and/or inspection (e.g., as provided by the Java™ Virtual Machine Tool Interface, or JVM TI). Such an instrumentation agent can register with the appropriate application programming agent (API) associated with the component or process being monitored in order to be notified when entry and/or exit points occur. This allows the instrumentation agent to detect requests and responses, as well as the characteristics of those responses. In particular, this functionality can allow an agent to detect when a component begins reading and/or writing from and/or to a socket, to track how much data is accessed (e.g., read or written), obtain a copy of the data so read or written, and generate timing information (as well as information describing any other desired characteristics) describing the time at which the data was read or written.

Some agents are configured to monitor individual threads by monitoring the storage used by each thread (i.e., the thread local storage for that thread). Such agents can detect when the monitored thread begins reading or writing to a thread local variable in the thread local storage. In response to detecting this access to the thread local variable, the agent can track the amount (e.g., in bytes, as tracked by incrementing a counter) of data that has been accessed, as well as the starting offset within the thread local storage to which the access takes place. In response to detecting that the thread's access to the thread local variable has ended, the agent can use the information about the access to identify characteristics such as the time of the access, the variable being accessed, the value being accessed, among other examples.

Application servers (e.g., 106) can include any suitable software component or module, or computing device(s) capable of hosting and/or serving a software application (e.g., 118), including distributed, enterprise, or cloud-based software applications. For instance, application servers can be configured to host, serve, or otherwise manage web services or applications (e.g., 118), such as SOA-based or enterprise web services, or applications interfacing, coordinating with, or dependent on other enterprise services. Applications and services (e.g., 118) provided through application servers 106 can further include web services under development. In some instances, some combination of one or more of application servers 106 can be hosted on a common computing system, server, or server pool, and share computing resources, including shared memory, processors, and interfaces, such as in an enterprise software system serving services to a plurality of distinct clients and customers. In some instances, application server 106 can consume resources and service served by other servers (e.g., 108, 110, 112, 114, 116) in the system. For instance, an application server can participate in transactions with software components (e.g. 122, 124, 126) served by one or more of software servers 108, 110, 112.

The illustrated implementation of FIG. 1 further includes one or more local and/or remote clients 102, 104. A client 102, 104 can be any computing device operable to connect or communicate at least with an application or other service (such as served by any one or more of servers 106, 108, 110, 112, 114) over network 120, using a wireline or wireless connection. Indeed, clients 102, 104 can also execute services, applications, and resources locally, including software components interfacing with instrumentation agents. Further, each client 102, 104 can include at least one graphical display device and user interfaces (e.g., 170, 172), allowing a user to view and interact with graphical user interfaces of test management software (e.g., provided through test server 116) or agent management software (e.g., provided through agent server 114). For instance, such graphical user interfaces can include interfaces for use in launching a test, providing instructions and parameters for a test, editing or otherwise modifying a test, editing or launching agents for use in a test, viewing details and progress of a test, viewing health of the test system, viewing the provisioning of hardware resources for a test, etc. In general, the client 102, 104 can include any electronic computing device operable to receive, transmit, process, and store any appropriate data associated with the software environment of FIG. 1. It will be understood that there may be any number of clients 102, 104 associated with system 100, as well as any number of clients 102, 104 external to system 100. Further, the term "client" and "user" may be used interchangeably as appropriate without departing from the scope of this disclosure. Moreover, while each client 102, 104 is described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
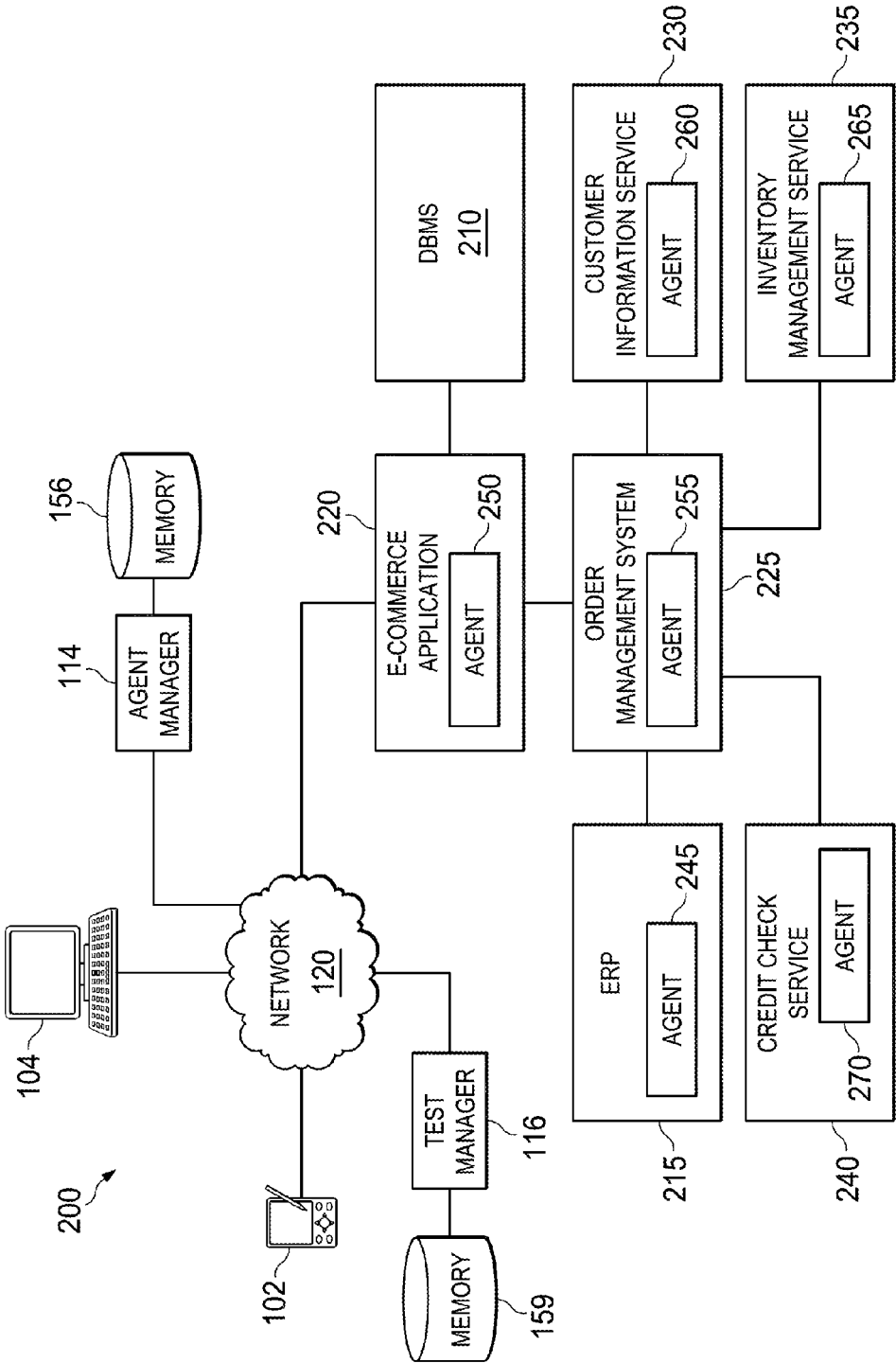
FIG. 2 is a schematic representation of example software systems including instrumentation agents.

Turning now to FIG. 2, a schematic representation 200 is shown of an example software system including instrumentation agents. In one example, an e-commerce application 220 in either pre- or post-production, is available for testing using one or more test systems (e.g., 116). While in the present illustration, the system under test includes an e-commerce application, in practice, the system under test can be any type of software-based application, system, or sub-system including multiple software components. Further, software components other than those illustrated in the present example can be monitored during a test and can operate cooperatively with embedded agents. In the present examples, the e-commerce service includes a plurality of software components 210, 215, 220, 225, 230, 235, 240 that, when deployed, provide e-commerce services, for instance, for an online retailer. At least some of the included software components 220, 225, 230, 235, 240 can include agents (e.g., 240, 245, 250, 255, 260, 265, 270) interfacing with the software components (e.g., 210, 215, 220, 225, 230, 235, 238 respectively). Other software components involved in the system may lack an agent, (e.g., software component 210).

According to its current design, development, or implementation, an example system can utilize software components to perform certain transactions. In the example e-commerce application 220 of FIG. 2, an e-commerce application 220 is implemented as a composite system making use of a plurality of software components including a first database management system (DBMS) 210 and an order management system (OMS) software component 225, which itself consumes an customer information service software component 230, inventory management service software component 235, credit check service component 240, and enterprise resource planning (ERP) service software component 215, among potentially other software components. In some instances, one or more software components can be re-usable and/or semi-customizable software components, such as re-usable software components provided by one or more enterprise and service-oriented software vendors. Indeed, some software components can be deployed in multiple different systems. Further, a composite software system can include software components from a plurality of sources and vendors.

The example e-commerce application 220 of FIG. 2 can be designed to respond to client requests and interactions relating to the purchase of a good or service offered through the e-commerce application 220. Further, the e-commerce application 220 can be designed to exchange messages with back-end software components OMS 225 and DBMS 210. Other software components can also participate in transactions and exchange data with other software components in the system. For instance, OMS 225, can exchange messages with one or more of customer information service software component 230, inventory management service software component 235, ERP service software component 215, among other components, for example, in connection with responding to a request from e-commerce application 220. In some instances, two or more of software components 210, 215, 220, 225, 230, 235, 240 can be provided by third-party service providers.

In instances where a test of a system is performed on an instance of the system itself, rather than a test system, the test can make use of and be dependent upon real data used, stored, and managed by the system as well as for-production software components, complete with the data anomalies, bugs, and component errors existent in the actual system. While testing the for-production system directly can be beneficial in some instances, imperfections in the data and components included in the for-production system can make testing of the system difficult. For instance, in one example test, a transaction can be monitored and tested involving OMS 225, e-commerce application server 220, and customer information service 230. To perform the test, the transaction can be launched by simulating a customer's attempt to purchase a good or service or to apply a discount based on a customer identity, among other examples. During normal functioning of the system, the customer's credit might be checked in order to proceed with processing of the order by the OMS 225. In some instances, credit check service 240 can generate a positive credit approval message while in other instances generating negative credit denial messages, that can result in an e-commerce sale being cancelled. Accordingly, successful processing of the order, and transactions involved in the processing of the order, can be dependent on the result returned by the credit check service 240. The functions of the credit check service 240, however, may not be the focus of the test in this example, and undesirable results returned from the credit check service 240 (e.g., a credit denial message) may affect the processing and flows involving other software components and transactions that are of interest in the example test. For instance, the example test may define assumptions that all credit checks will be approved during the test. Rather than hard-coding and deploying a test-specific stub of the credit check service that only returns credit approvals, so as to meet the assumptions and objectives of the test, an agent can be used that intercepts the output of the credit check service 240 and operates to ensure that only positive credit check results are delivered from the credit check service 240 during execution of the particular example test. For instance, the agent can modify intercepted instances of a negative credit check result and modify the result before it is processed by the OMS 225 to ensure that the OMS 225 operates on a positive credit approval, in keeping with the defined assumptions for the test.

Figure 3:
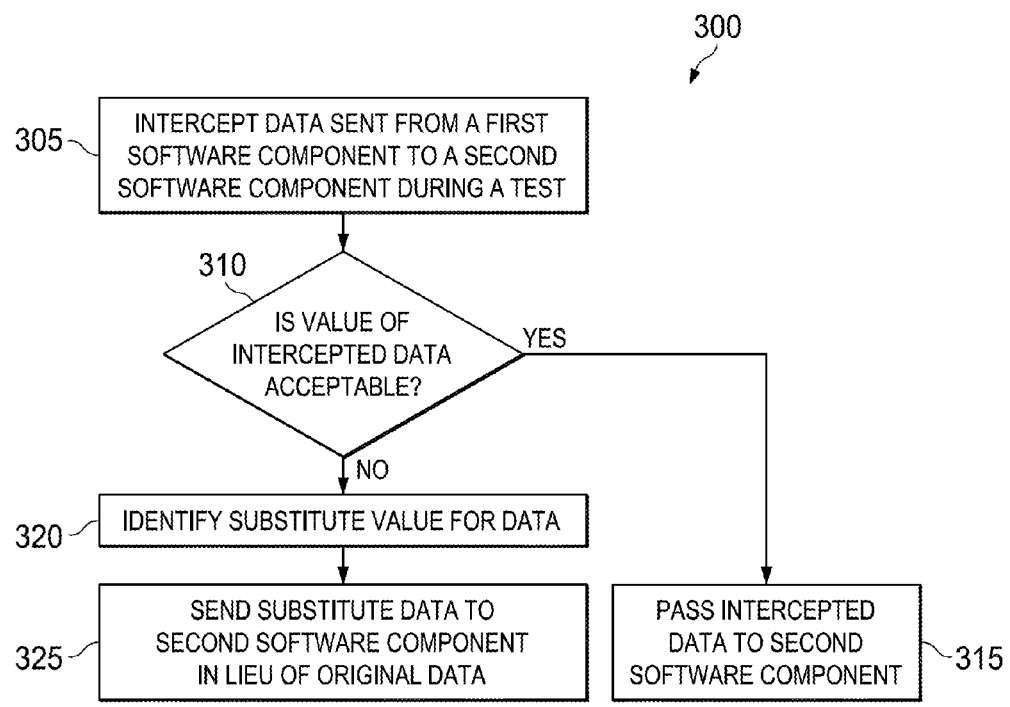
FIG. 3 is a flowchart of an example technique for using instrumentation agents to modify software component messages.

FIG. 3 is a flowchart 300 illustrating steps of an example technique for using instrumentation agents to modify software component messages to realize, for example, some of the benefits, goals, results, features, and/or functionality described above. Data sent between a first and second software component can be monitored by an instrumentation agent. The agent can intercept 305 data sent from the first component to the second component during a particular test. The agent can analyze the intercepted data before allowing it to proceed to the second component to determine 310 if one or more values of the intercepted data are acceptable within the context of the particular test. Whether the data values are acceptable or not can be based on a number of factors, determined by the particular logic of the agent employed to monitor messaging, communications, and/or transactions between the particular first software component and one or more other software components and based at least in part on the characteristics and definition of the particular test. Further, the agent can further base the determination 310 on the features, identity, role, and functionality of the software components involved in the messages intercepted 305 by the agent.

If it is determined 310 that a particular value of the intercepted data is acceptable within the context of a particular test, the agent can then allow the data to pass 315 to the second software component for processing in connection with the test of the system. This can involve the agent forwarding the intercepted data, for instance, in total or as-is, directly from the agent to the second software component, rather than directly from the first software component. In some instances, the agent can be in communication with, integrated with, interface with, or otherwise be associated with one or the other of the first and second software components so that the interception and passing of data from the agent to the second software component appears, to the second software component (and the test manager), to actually originate from the first software component so as to protect against the second software component rejecting the data passed from the agent.

In instances where the agent determines 310 that the value of the intercepted data is unacceptable within a particular test, the agent can identify 320 a substitute value for the intercepted value that is more in accordance with the objectives of the particular test than the original value of the intercepted data. Data with the substitute value can then be sent 325 to the second software component in lieu of data having the original value. A substitute value for intercepted data can be determined, generated, or otherwise identified 320 in an attempt to provide an input to the second software component that would enable a particular test flow or test results to be realized that are different from (and more in line with the objectives of the test than) what would have resulted had the original value of the data been used.

In some examples, the identity of the test can serve as the basis for the substitute value that is identified and provided by the agent for data intercepted by the agent. In some implementations, a substitute value can be identified or generated by the agent itself based on a model of one or more previously-observed or understood transactions involving at least the first and second software components. For instance, through the observation of interactions, communications, messaging, and transactions between the first and second software components, models can be generated and particular substitute data values can be identified (based on prior observed transactions and results) that can be adopted by the agent to effect similar results, outputs, flows, or processes. For instance, based on previously-observed messaging or transactions under conditions similar to those detected by the agent during monitoring and intercepting of data between the first and second software components, an agent can identify or generate substitute data with values similar to those observed in the previous successful transactions. A rich variety of logic and algorithms can thus be applied within a variety of agents depending on the purpose of the agents as well as the software components monitored using the agents, including techniques and principles discussed herein.

Figure 4B:
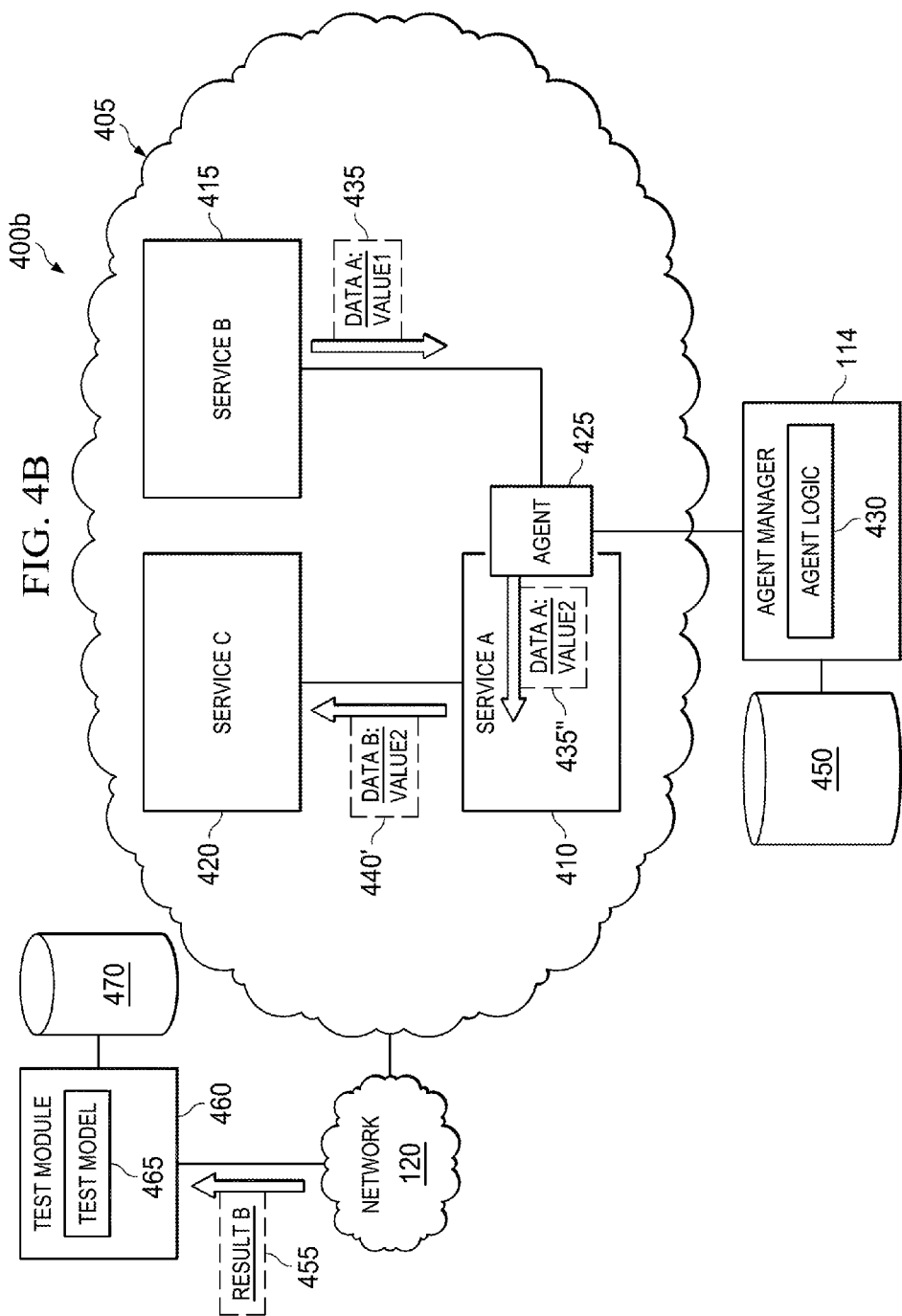

FIGS. 4A-4B illustrate representations 400a-b of example uses of instrumentation agents to modify incoming software component responses during a test. As shown in the example of FIG. 4A, an application, service, or system (405) under test can incorporate a plurality of different software components (e.g., 410, 415, 420) designed to operate cooperatively within a composite software system. A test module 460 can be provided to launch, control, record, and otherwise manage the test of the system 405. In one example, one or more software components (e.g., 410) can have an embedded or interfacing instrumentation agent (e.g., 425) operating in connection with the software component and for use within the context of a test of the system 405. In the example of FIG. 4A, agent 425 is embedded in software component A 410 and makes use of logic to intercept messages, in at least some test scenarios, that are received from one or more other software components (e.g., 415, 420) capable of communicating (or operating cooperatively) with the software component 410 during the test. In some examples, an agent can be dedicated to monitoring, intercepting, analyzing, and modifying messages and data sent from a particular software component (e.g., 415) or set of software components. In instances where a single software component is reused across multiple composite applications, an agent can also be configured to be adapted to a particular composite application or service including the software component. Indeed, a single software component can include a plurality of different agents, each dedicated to a particular function, test scenario, transaction, use case, etc. In other instances, a single agent can be tasked with handling a wide (or the full) array of messaging, transactions, interactions, tests, and use cases in which the corresponding software component may participate.

Continuing with the example of FIG. 4A, in the flow of a particular test, data 435 can be sent from software component B 415 destined for at least software component A 410 and for use by software component A 410. An agent 425 can intercept data 435 before it is acted upon (or even received) by software component A 410. The agent 425 can make use of logic 430 provided and/or generated, for example, by an agent manager 114, to analyze intercepted data 435 and determine whether, and under what conditions, the intercepted data 435 should be allowed to pass to software component A 410 (with its present values). The outcome or objective of the test can be influenced by results generated by software component A 410 acting on data received from software component B 415. Accordingly, agent 425 can also use logic 430 to determine when (and how) the values of the intercepted data should be modified by the agent 425 to realize a particular goal, response, or output of a test (e.g., by affecting the results generated by one or more software components in response to receiving one or more inputs).

In the example of FIG. 4A, agent 425 analyzes data 435 and determines that the data 435 should be allowed to pass to software component A 410 at least substantially as-is (e.g., as data 435'). Such a determination can be based, for example, on a test model 465 definition that specifies the collection of test data describing the precise nature and values of the (intercepted) data transmitted from software component B 415 to software component A 410. In other instances, where the intercepted data is not specifically one of the focuses of the test, the determination to pass (and not modify) the data 435 can be based on an observation that the value of the data 435 sufficiently comports with assumptions of the test model or otherwise permits the test flow to carry on as intended. For instance, the agent 425 can determine that were software component A 410 to act on data 435' (and generate response data 440 based at least in part on the values of data 435'), response data 440 generated by the software component A 410 would likewise be acceptable within the context of the particular test scenario (or model 465). Based at least in part on the value of data 435 passed from software component B 415 and acted upon by software component A 410, particular test results 445 can also be collected (e.g., at memory 470) based on one or more iterations of the test. Such test results 445 can reflect the output of monitored software components and transactions downstream from the transaction involving software components A and B and data 435.

Different test results 445, even unacceptable test results, can potentially result based on the value of data exchanged in software components transactions within a flow of a particular test. In one example, as shown in the example of FIG. 4B, agent 425 can receive data 435 and determine that one or more values of data 435 are unacceptable within the context of the particular test (e.g., as defined by test model 465). In response to determining that values of intercepted data 435 are unacceptable within the context of a particular test, agent 425 (e.g., using logic 430 provided by agent manager 114) can identify or generate one or more substitute values for data 425 and modify data 435 (to generate 435") consistent with the objectives of a given test before allowing software component A 410 to act on the data. In such an instance, it can appear to software component A 410 (and test module 460) that data 435", as modified by agent 425, is the genuine output of software component B 415. Accordingly software component A 410 can act upon the modified data 435" to generate one or more results.

In some instances, the modifications to data 435" can result in software component A 410 processing the data 435" to return a result different from what would have resulted had software component A 410 processed the data as originally sent from software component 415 (i.e., data 435' of example FIG. 4A). Indeed, in the example of FIG. 4B, data 440' output from software component A 410 has a value different from the data 440 returned by software component A 410 in the example of FIG. 4A. Additionally, in this particular example, the effect of the modifications of agent 425 on data 435 can be perpetuated throughout the test of the system 405 thereby resulting in potentially different results and outputs generated by downstream components (e.g., 420) as well as test results 445 returned in response to the test.

While agents can be provided to assist with the control and monitoring of a particular test, when agents modify data received (or output) by software components in the system under test, the modification, themselves, can affect the results of the test (as illustrated, for instance, in the examples of FIGS. 4A-4B). As the actions of a single agent embedded within a single software component can affect the output of downstream components and collected test results, it can be useful to provide accounting functionality to track and understand when and how particular agents have intervened during the course of a test run of a system. Accordingly, an agent (e.g., 425) can generate data outlining transactions monitored, messages intercepted, and modification made, including context data, metadata, and other data describing the conditions of the agent's intervention in a transaction and involvement within a given test. Further, agents can collect this and other data relating to the transaction and provide this data for inclusion in test results collected from the test. For instance, in response to detecting a request, response, and/or other activity to be monitored at the corresponding software component, agents can be configured to detect and record one or more characteristics observed by the agent and associated with that activity and/or the monitoring of that activity by the agent. Whether reporting agent accounting data or test result data, characteristics observed by the agents can be embedded in messages (or "frames") sent from the agent to an agent manager (e.g., 114) that can include, for example, a frame identifier, which identifies a particular message sent by the agent to the agent manager; a parent identifier, which identifies the software component or other source of data sent to the component or sub-component and monitored (and/or intercepted) by the agent; a transaction identifier, identifying the transaction, with respect to the component or sub-component being monitored; an agent identifier that identifies the particular agent, with respect to other instrumentation agents in the software environment or system, that is generating the frame; and a test identifier identifying the particular test during which the characteristics were observed.

A frame generated and sent by an agent to agent manager 114 can report substitute data generated and modifications made by the agent to data intercepted during a transaction within a test. Further, characteristics of the transaction can be captured and calculated by the agent, including a system clock value, current processor and/or memory usage, contents of the request, contents of the response to the request, identity of the requester that generated the request, identity of the responder generating the response to the request, Java virtual machine (JVM) statistics, standard query language (SQL) queries (SQLs), number of database rows returned in a response, logging information (e.g., messages logged in response to a request and/or response), error messages, simple object access protocol (SOAP) requests, values generated by the component that includes the instrumentation agent but that are not returned in the response to the request, web service invocations, EJB method invocations, EJB entity lifecycle events, heap sizing, among other examples. Characteristics can also include the thread name of a thread processing the request to generate the response, the class name of the class of an object invoked to process the request to generate the response, a Web Service signature used to contain the request and/or response, arguments provided as part of the request and/or response, a session identifier, an ordinal (e.g., relating to an order within a transaction), the duration of time spent processing the request and/or generating the response, state information, a local Internet Protocol (IP) address, a local port, a remote IP address, a remote port, among other examples.

Characteristic and reporting information can include information generated by the agent itself and information generated and/or processed by the component or sub-component monitored by the agent, as well as information included in data and messages intercepted by the agent. In some embodiments, each agent collects information to form a message, or frame, describing characteristics associated with a particular transaction involving the monitored software component. In such embodiments, instead of simply monitoring the performance of a single component and aggregating information about that component over a multitude of transactions, agents can provide characteristics that are specific to and correlated with specific transactions. More particularly, characteristics captured and reported by an agent can be specific to and correlated with particular messages or data monitored, intercepted, and/or analyzed by the agent in connection with a particular transaction.

The agent manager can store (e.g., in data store 250), manage, process, or otherwise use information included in received frames to generate reporting data for use by administrators and other users to monitor the use and functionality of one or more agents within one or more systems. In some implementations, agents can communicate with one or more of agent managers (e.g., 114) and test modules (e.g., 460) to report agent accounting data and/or test results data via messaging systems such as Java™ Message Service (JMS). Additionally, agent and test managers can create a messaging system topic for each transaction (referred to herein as a transaction frame (TF) topic) and subscribe to that TF topic. Accordingly, agents (e.g., 425), upon startup, can broadcast their existence to each other and/or one or more agent managers (e.g., 114) and test modules (e.g., 460). In certain instances, agents can receive one or more TF topic from agent managers and/or test modules and begin publishing messages onto a message bus on that TF topic. An agent manager or test module can then monitor the published messages and determines whether those messages relate to the current TF topic. Agents can alternatively communicate with agent and test managers using techniques other than those involving messaging systems. As but one example, agents can write information to databases (e.g., at 450) using database commands, and an agent manager 114 or test module 460 can monitor those database commands to detect new information.

While the examples of FIGS. 4A-4B illustrate the use of agents intercepting messages sent from other software components (i.e., at the receiving software component), FIGS. 5A-5B illustrate representations 500*a-b* of other examples of using instrumentation agents to modify outgoing software component responses. For instance, as shown in FIG. 5A, an agent 460 can be embedded in software component B 415 to monitor data output by software component B 415 during a test and destined for use by other downstream software components in the system 405 under test (e.g., software component A 410). In this implementation, agent 460 inspects outputs of a software component (e.g., 415) prior to the output being passed to one or more other software components in a system in connection with the flow of a particular test. For example, as shown in FIG. 5A, agent 460 can inspect data 435, prepared by software component B 415 for forwarding to software component A 410. Before the data 435 is sent, agent 460, added to and supplementing the functionality of software component B 415, can inspect the data 435 to determine whether data 435 with these values should be passed to, and potentially used by, software component A 410 within the context of a particular test. In this particular example, agent 460 can make use of agent logic 465 to determine that the data 435 is acceptable to send within the context of the test, passing data 435' to software component A 410 for use by software component A 410 during the test, the value of the passed data 435' substantially the same as the value of the data original generated by software component 415.

As in the examples of FIGS. 4A-4B, the values of data 435 (and 435') can affect downstream results (e.g., 440) of the receiving software component (e.g., 410) as well as the results 445 of the test itself. Turning to FIG. 5B, agent 460 can also intercept data 435 before it is sent to downstream software components or sub-components and determine that data 435 should not be passed as-is, based, for example, on characteristics, assumptions, objectives, and defined flow paths of a particular test. Further, agent 460 can identify or generate a substitute value for the data 435 and pass substitute data 435" to software component A in lieu of the original data 435, based on the determination. As in other examples, logic 465 can be used to determine whether intercepted data (e.g., 435) is acceptable within a certain test context. Logic 465 provided to the agent 460 can also be used to generate substitute data values appropriate to the particular test.

In some implementations, logic 465 can be based on or consult pre-generated models of interactions between two or more software components or sub-components. The models can be generated, for example, from pre-observed messaging between the software components, as well as from responses of the components, and the system itself, to outputs of software component B 415. In certain instances, the monitoring and observation of software components and transactions during a test can also (i.e., later) serve as the basis of a model used by an agent in the generation of substitute values for data intercepted between similar software components or within a similar transaction. Additionally, data intercepted by an agent during a test can also be used to adjust and optimize a preexisting model upon which agent logic (e.g., 450, 465) can be based. Agents (e.g., 425, 460) can identify or generate substitute values for data, from the models, based on pre-observed data values that led to one or more desired outcomes and attempt to reconstruct these outcomes (e.g., in accordance with a particular test scenario) by modifying intercepted data to pass data that more closely mimics the desirable, pre-observed data and behaviors.

For instance, returning, for purposes of simplicity, to the credit check software component example discussed earlier, operation, interactions, transactions, and messaging of a composite e-commerce application can be observed to develop a model of the e-commerce application. Further, the model can indicate that a positive credit check result, returned from a credit check software component used in the e-commerce application, can assist in permitting the completion of various downstream transactions within the system. Accordingly, in response to determining that a particular intercepted output of the credit check software component is undesirable in a particular test of the system, the agent can identify a substitute value for the intercepted data by consulting the generated model. For instance, the agent can identify a substitute value from the model that helped facilitate the completion or successful initiation of certain downstream transactions that are of some importance to and will be monitored by the particular test. Further, the agent can also identify from the model that the output intercepted from the credit check software component, if left unmodified, would result in some of these tested transactions not being successfully initiated or completed, thereby triggering the generation of a substitute value for the intercepted data, among other examples. Such a model could then be used, by agents at either the receiving software component (e.g., agent 425) or the sending software component (e.g., agent 460), to generate or otherwise identify data values that are amenable to effecting a particular result or test flow during a test. Indeed, in some implementations, a single agent can possess logic enabling the agent to intercept and modify data received from other components in some instances (such as shown and described in the examples of FIGS. 4A-4B), and intercept and modify data sent from the agent's software component to other software components in other instances (such as shown and described in the examples of FIGS. 5A-5B).

As noted above, to mitigate against undesirable dependencies and test flows resulting from a outputs and operations of certain sub-components or components of the system under test, it can be desirable to conditionally and temporarily alter the logic of certain components, using instrumentation agents, to realize certain objectives of a particular test. Such multi-function agents can provide logic for intervening within a variety of system transactions and a diverse array of different tests to assist, for example, in realizing the particular objectives of the tests.

Figure 6B:
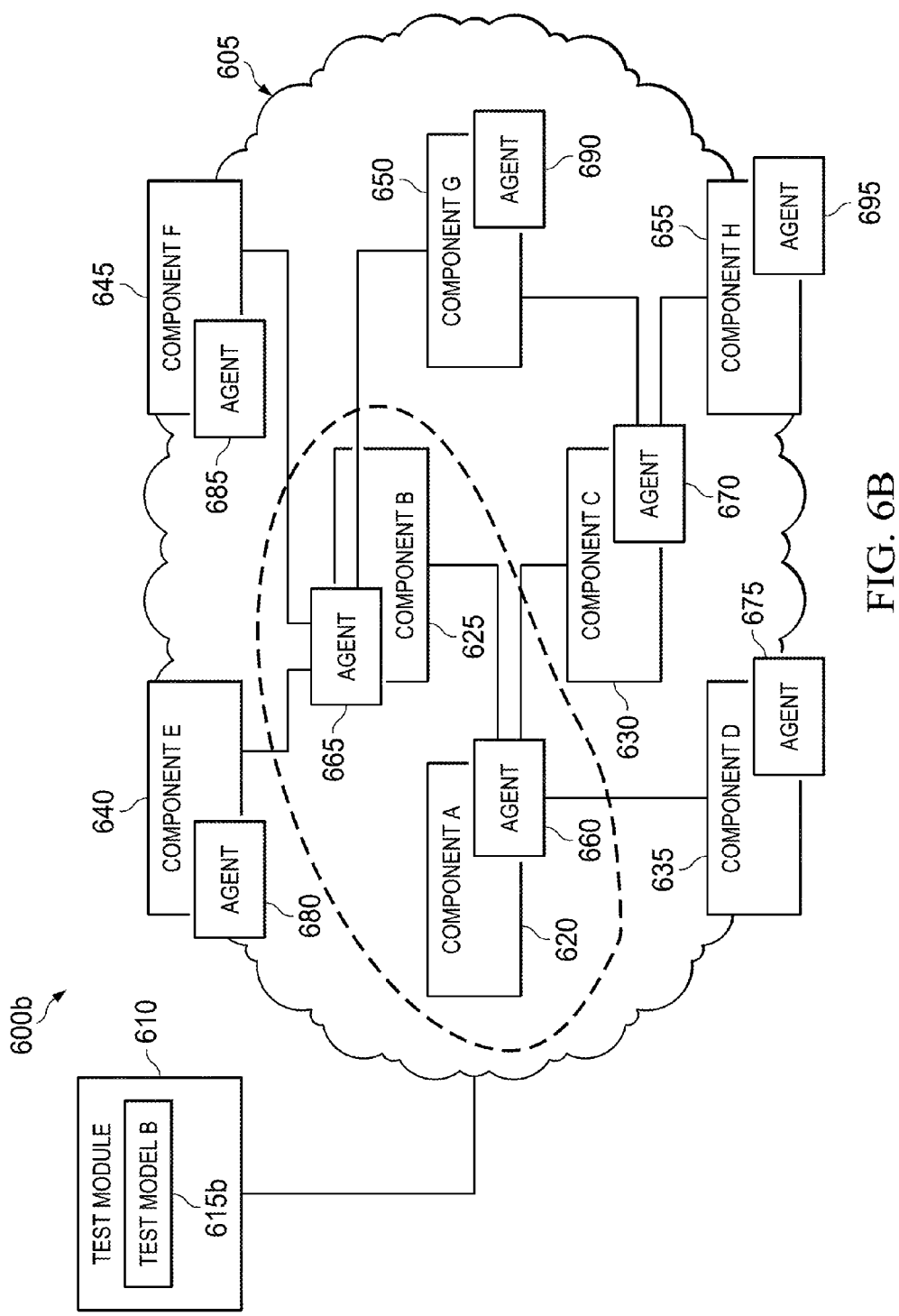

FIGS. 6A-6B illustrate representations 600a-b of examples of using instrumentation agents to modify software component interactions based on test characteristics. FIG. 6A illustrates an example system 605 including several software components (e.g., 620, 625, 630, 635, 640, 645, 650, 655) that can be tested, for example, using a test manager 610 including functionality and modules similar to those described in other examples above. One or more of the software components in the system 605 can be equipped with embedded instrumentation agents (e.g., 660, 665, 670, 675, 680, 685, 690, 695) for use in connection with a test of the system managed by test manager 610.

In the example of FIG. 6A, a first test is to be run on the system according to test model A 615a. In this example first test, interactions and transactions involving components A (620), C (630), and D (635) are to be monitored (among potentially other components) and are the focus of the test. While the operations and transactions of components A (620), C (630), and D (635) are the focus of this particular test, operations and transactions of components A (620), C (630), and D (635) can be dependent on and be otherwise influenced or affected by operations, results, and transactions involving other components in the system. To illustrate, in one example, component C 630 can be a software component tasked with managing user profiles of a social networking application served by component A 620. An instant messaging platform served by component D 635 can also be used in connection with component A's social networking application. Further, the test defined by test model A 615a can be a load test focused on simulating traffic involving instant messaging in the social networking application among a plurality of registered users. Accordingly, the test defined by test model A 615a can focus on interactions and transactions between components A (620), C (630), and D (635) as well as monitoring of components A (620), C (630), and D (635) to see how the combination of components (i.e., 620, 630, 635) respond to various traffic loads.

Continuing with this particular example, the user profile manager of component C 630 can be dependent on and make use of various other components in connection with providing user data to component A 620. For instance, in one example, component G 650 can be an authentication engine tasked with authenticating various users before the profile data corresponding to the user is shared with or used by other components (e.g., 620, 635). However, the test defined by test model A 615a may not be concerned with scenarios involving an improperly authenticated user. Nonetheless, during operation of component C 630, it may be the case that component C completes an authentication transaction with component G before processing and participating in transactions involving component A 620. Accordingly, if component G happens to refuse to authenticate a user during the test, the remainder of the test flow (e.g., involving components A 620 and d 635) may not proceed as desired, undermining objectives of the test. Accordingly, agent 670, embedded in component C 630, can identify test model A 615*a* and activate or otherwise utilize particular logic to intercept and analyze data sent from component G 650 to component C 630 during the test defined by model A 615*a*. Further, agent 670 can modify the intercepted data so that the intercepted data consistently reflects a positive authentication result, thereby allowing the flow of the test to consistently move forward. In instances where a positive authentication result is forwarded from component G 650 to component C 630, agent 670 can allow the data to pass freely to component C 630 for processing. However, in examples where the intercepted data reflects a negative authentication result, agent 670 can modify values of the data to comport with what would have been expected for a positive authentication result and forward this modified data to component C 630 for processing.

Continuing with this particular illustrative example, component C 630 can participate in transactions with component A 620 in connection with a test flow defined by test model A 615*a*. While agent 660 can be embedded in component A 620 to potentially intercept and inspect data received from component C 630 during the test, in certain instances and tests, agent 660 may refrain from making any modifications to data received from component C 630 during a particular test and bound for component A 620. Indeed, error messages may be generated by component C 630 that impact subsequent transactions monitored by the test, and depending on the nature and objectives of the test, such error messages may be nonetheless allowed to freely pass to component A and may themselves be recorded or accounted for in test result data generated during the test. For instance, in the example of the load test focused on transactions involving components A (620), C (630), and D (635), errors and other data may be of importance to the particular test as well as the reaction of component A in response to receiving such data. That said, some data values sent from component C 630 to component A 620 may be modified or polished by agent 660, depending on the objectives of test model A 615*a* and the logic of agent 660. Further, the logic of agent 660 can be specifically provided to accord with the objectives of test model A 615*a*, and be activated or otherwise applied by the agent 660 in response to identifying that software component A 620 is operating within the context of a test defined by test model A 615*a*.

In the example of FIG. 6A, agents (e.g., 660, 670) embedded in certain software components (e.g., 620, 630) under test can behave according to a particular subset of logic and analyze and modify certain types of received data in accordance with that logic. Within the context of other tests and test types, agent 660, 670 can behave differently (i.e., in accordance with the specific objectives of thee other tests). For instance, turning to the example of FIG. 6B, system 605 can be tested according to a test model B 615*b* different from the test model A 615*a* of the example of FIG. 6A. In the example test of FIG. 6B, the operations and transactions of components A (620) and B (625) can be the focus of the test. Some transactions monitored during the test defined by test model B 615*b* may nonetheless depend on operations and transactions of other components outside of the focus of the test. For instance, component A (620) may depend, in some instances, on outputs and results received from component C 630. While in the example described in connection with FIG. 6A, agent 660 may not have intervened in data sent from component C 630 to component A 620, in the test defined by test model B 615*b*, agent 660 may apply different logic to more actively monitor, intervene, and potentially modify data returned from component C 630. Indeed, agent 660 can apply this logic upon identifying that that software component A 620 is operating within the context of a test defined by test model B 615*b* (rather than a test defined by another test model, such as test model A 615*a*). Additionally, agent 670, during the test of test model 615*b*, may also monitor and intervene in communications between component G and component C less aggressively in this test than in the test described in the example of FIG. 6A and/or under conditions different from those described in the example of FIG. 6A. Such are but two of the numerous examples of agents' ability to tailor their involvement and intervention in transactions of components under test based on the particular test being performed. It should be appreciated that a potentially limitless number of examples can be imagined with combinations of agents applying varied and conditional logic in connection with a similarly limitless and diverse array of tests that can be applied to software components monitored by and associated with the agents.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, agent, module, (software) tools, (software) engines, or code) can be written in any form of programming language, including compiled or interpreted languages, declarative or procedural languages, and it can be deployed in any form, including as a standalone program or as an agent, module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems (e.g., system 100) may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, that are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system (e.g., 100). A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
   intercepting, using a first agent, first data sent to a first software component from a second software component during a particular instance of a test of a particular software system, wherein the first data is generated by the second software component and each of the first and second software components are included in a plurality of software components included in the particular software system;
   receiving, at the first agent, test information for the test from a first one of a plurality of test models;
   determining, at the first agent, that a particular value of the intercepted first data is different from one or more preferred values for the first data based at least in part on the test information, wherein other instances of the first data that have preferred values, as intercepted by the first agent in other instances of the test, are to be allowed to be passed by the first agent to the first software component in the other instances of the test;
   passing substitute data having a preferred value to the first software component in lieu of the intercepted data based at least in part on the test information; and
   generating, at the first agent, reporting data to describe intervention of the first agent during the particular instance of the test, wherein the reporting data identifies that the first agent passed the substitute data in lieu of the intercepted data and describes context for the intervention of the first agent.

2. The method of claim 1, wherein the one or more preferred values for the first data permit successful completion of the test.

3. The method of claim 1, wherein the value of the intercepted first data, when used in the test, causes an undesired test result.

4. The method of claim 1, wherein at least one test result collected during the particular instance of the test is dependent on the value of first data sent to the first software component from the second software component.

5. The method of claim 4, wherein the first software component uses the substitute first data to generate additional data and the at least one test result collected during the particular instance of the test is dependent on the additional data.

6. The method of claim 5, wherein the additional data is collected as the at least one test result.

7. The method of claim 4, wherein the particular test is based on a test flow including (i) a first transaction including the sending of the first data to the first software component from the second software component, and (ii) at least one second transaction downstream from the first transaction in the test flow, the second transaction at least partially dependent on the value of first data sent to the first software component from the second software component in the first transaction, wherein the test result is collected from monitoring of the second transaction.

8. The method of claim 1, further comprising identifying one or more aspects of the first instance of the test, wherein determining whether the particular value of the intercepted first data is different from one or more preferred values and passing substitute data having preferred values to the first software component in lieu of the intercepted data is based at least in part on the identified one or more aspects of the first instance of the test.

9. The method of claim 1, wherein the test comprises a first test having a first test model, the method further comprising:
   intercepting, using the first agent, second data sent to the first software component from the second software component during a second test of the particular software system, the second data having a second value equal to the particular value of the first intercepted data and the second test having a second test model different from the first test model;

receiving, at the first agent, second test information based on the second test model;

determining, at the first agent, that the second value of the intercepted first data conforms to a preferred value for the second data in the context of the second test based at least in part on the second test information; and allowing the second data having the preferred second value to pass to the first software component during the second test.

10. The method of claim 1, further comprising determining an identity of the test, wherein determining whether values of data, intercepted by the first agent, are preferred is based at least in part on the identification of the test.

11. The method of claim 1, wherein the first agent interfaces with the first software component and intercepts the first data before the first data is received by the first software component.

12. The method of claim 1, wherein the first agent interfaces with the second software component and intercepts the first data before the first data is sent to the first software component from the second software component.

13. The method of claim 1, wherein the particular software system under test is a composite software system and the first software component is an element of a first software system and the second software component is an element of a distinct, second software system.

14. The method of claim 1, further comprising generating the substitute first data at the first agent in response to determining that the particular value is different from the one or more preferred values.

15. The method of claim 14, wherein the substitute first data is generated based on monitored interactions between the first and second software components.

16. An article comprising non-transitory, machine-readable media storing instructions operable to cause at least one processor to perform operations comprising:

intercepting, using a first agent, first data sent to a first software component from a second software component during a particular instance of a test of a particular software system, wherein the first data is generated by the second software component and each of the first and second software components are included in a plurality of software components included in the particular software system;

receiving, at the first agent, test information for the test from a first one of a plurality of test models;

determining, at the first agent, that a particular value of the intercepted first data is different from one or more preferred values for the first data based at least in part on the test information, wherein other instances of the first data that have preferred values, as intercepted by the first agent in other instances of the test, are to be allowed to be passed by the first agent to the first software component in the other instances of the test;

passing substitute data having a preferred value to the first software component in lieu of the intercepted data based at least in part on the test information; and generating, at the first agent, reporting data to describe intervention of the first agent during the test, wherein the reporting data identifies that the first agent passed the substitute data in lieu of the intercepted data and describes context for the intervention of the first agent.

17. A system comprising:
a memory element storing data;
a processor operable to execute instructions associated with the stored data; and
at least one first software component interacting with at least one other software component in a software system;
at least one agent configured to:
intercept particular data sent to the first software component from at least one other software component during a particular instance of a test of a software system including at least the first software component and the other software component;
receive test information for the test from a first one of a plurality of test models;
determine that a particular value of the intercepted particular data is different from one or more preferred values for the particular data, within the context of the test based at least in part on the test information, wherein other instances of the first data that have preferred values, as intercepted by the first agent in other instances of the test, are to be allowed to be passed by the first agent to the first software component in the other instances of the test;
pass substitute data having a preferred value to the first software component in lieu of the intercepted particular data based at least in part on the test information; and
generate reporting data to describe intervention of the agent during the test, wherein the reporting data identifies that the agent passed the substitute data in lieu of the intercepted particular data and describes context for the intervention of the agent.

18. The system of claim 17, wherein at least the first software component and the at least one other software component are monitored by a test system during instances of the test.

19. The system of claim 17, wherein at least the first agent interfaces with an agent manager, the agent manager configured to:
provide logic to the first agent and at least one other agent intercepting data sent to a third software component included in the software system from a fourth software component also included in the software; and
receive reporting data from one or more of the first agent and the at least one other agent.

20. The system of claim 19, wherein the reporting data includes data identifying that the first agent passed substitute data having a preferred value to the first software component in lieu of the intercepted particular data.

* * * * *